United States Patent [19]
Graser

[11] 3,941,742
[45] Mar. 2, 1976

[54] MASS COLORATION OF POLYAMIDES

[75] Inventor: Fritz Graser, Ludwigshafen, Germany

[73] Assignee: Badische Anilin- & Soda-Fabrik Aktiengesellschaft, Ludwigshafen (Rhine), Germany

[22] Filed: Aug. 26, 1974

[21] Appl. No.: 500,637

[30] Foreign Application Priority Data
Sept. 7, 1973 Germany............................ 2345123

[52] U.S. Cl.............................. 260/37 NP; 260/374
[51] Int. Cl.².......................................... C09B 1/32
[58] Field of Search............... 260/37 NP, 37 P, 374

[56] References Cited
UNITED STATES PATENTS

| | | | |
|---|---|---|---|
| 2,345,533 | 3/1944 | Graves...................... | 260/37 NP X |
| 2,870,173 | 1/1959 | Hindermann et al........... | 260/374 X |
| 3,361,705 | 1/1968 | Koz et al......................... | 260/37 P |

*Primary Examiner*—M. J. Welsh
*Assistant Examiner*—S. M. Person
*Attorney, Agent, or Firm*—Johnston, Keil, Thompson & Shurtleff

[57] ABSTRACT

A process for the mass coloration of polyamide chips in which a dye of the formula

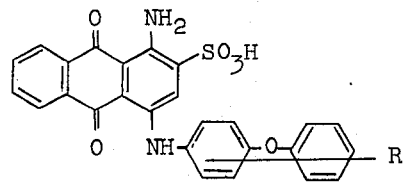

in which R is hydrogen or chloro is used. The dye is absorbed quantitatively or virtually quantitatively from the aqueous phase. After shaping, pure blue colorations are obtained having great thermal stability.

6 Claims, No Drawings

MASS COLORATION OF POLYAMIDES

The invention relates to the use of 1-amino-4-arylaminoanthraquinone-2-sulfonic acids for the mass coloration or dope dyeing of polyamides.

German Laid-Open Specifications (DOS) Nos. 1,903,235 and 1,794,122 disclose the use of reaction products of 1-amino-4-bromoanthraquinone-2-sulfonic acid and aromatic amines for the mass coloration of polyamides. Dyes used for mass coloration have to have good tinctorial properties. In particular, they have to be stable in the melt which has a reducing action.

For the dope dyeing of polyamides it is preferred to use chips or granules of polyamide colored from an aqueous liquor. In the interests of ecology it is now required that waste dye liquor should contain little or no dye, i.e. the dye has to be absorbed more or less quantitatively from the aqueous liquor.

The object of the present invention is to provide dyes which under the conditions of chip dyeing are absorbed quantitatively or substantially quantitatively by polyamide chips or granules, the colored chips being used for mass coloration or dope dyeing.

I have found that in the mass coloration or dope dyeing of polyamides the abovementioned disadvantages can be obviated by coloring polyamide chips or granules with a dye of the formula:

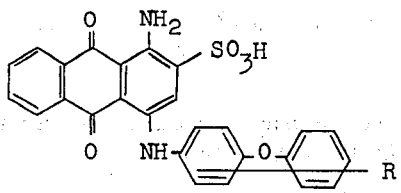

in which R is hydrogen or chloro and processing the colored polyamide into filaments, threads, wires, film or sheeting by a melt process.

Dyes to be used according to the invention are eminently suitable for the dope dyeing or melt coloration of polyamides because they have excellent resistance to high temperature and in the chip dyeing method are absorbed substantially quantitatively by the polyamide material from the aqueous phase.

The dyes give pure blue colorations which have excellent tinctorial properties.

The dyeing of the polyamide chips or granules is carried out by a conventional method, for example by the dusting method or preferably by the chip dyeing method.

Since the dye is not so finely dispersed in the molten material in the dusting method it is generally only the coarser items, for example bristles and wires, which can be prepared by this method.

The chip dyeing method is important for the production of colored granules or chips to be used for dope dyeing. The polyamide material colored by this method contains the dye in a very fine dispersion and may therefore be spun satisfactorily into very fine textile filaments and threads.

At a liquor ratio of from about 1:1 to 4:1 polyamide granules (chips) are colored up to exhaustion of the dye liquor at the boiling temperature. To accelerate absorption and to increase the degree of absorption it is advantageous to carry out dyeing in a weakly acid medium, for example after adding an acid or a buffer system or a salt of a weak base with a weak acid, such as ammonium acetate at a pH of from 5 to 6. The amount of dye may be varied within wide limits; it depends on the depth of color desired. A medium depth of color is achieved for example with a 0.5% dyeing. Coloring the polyamide granules may also be carried out at a temperature above 100°C, for example at 130°C, at superatmospheric pressure.

Instead of clear polyamide material it is also possible to use polyamide material which has been delustered, for example with titanium dioxide.

The dye may be used in the form of the free acid or a water-soluble salt of the same. Examples of salts are the alkaline earth metal salts and preferably the alkali metal salts, the ammonium salts and the amine salts.

Dyes of the formula (Ia):

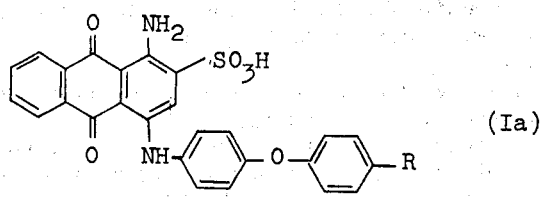

in which R is hydrogen or chloro are of special interest and the dye in which R is chloro is particularly preferred.

Dyes to be used according to this invention and particularly the dye of formula (Ia) with R equal to chloro have a much higher affinity in dyeing by the chip dyeing method than dyes of the closest prior art, for example the dye of the formula:

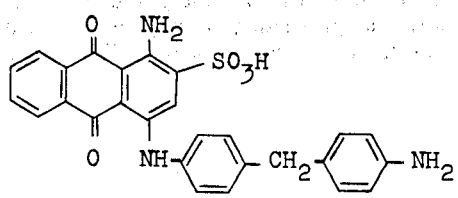

or the dye of Example 2 of German Laid-Open Specification (DOS) No. 1,903,235.

The following Example will further illustrate the invention. Percentages hereinafter given are by weight.

EXAMPLE

Nylon-6 granules are dyed in a stainless steel vessel provided with a stirrer and heating and cooling means at a liquor ratio of about 1:1 with 0.5% of the dye:

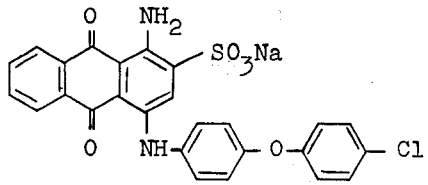

and 0.5% of ammonium acetate at 98° to 99°C until the liquor is completely exhausted. This takes from about one hour to three hours. The whole is cooled to about 30° to 40°C and the granules are separated from the clear, practically colorless liquor, washed with water until neutral, centrifuged, dried as usual in vacuo at 80°C, then spun in a spinning machine of the extruder type and finally drawn into 5-denier dilaments.

Dope-dyed filaments having a pure blue shade are obtained with very good fastness to light, wet treatments and crocking.

The dye has excellent stability at high temperature in the polyamide material. Thermostability is determined by melting the colored granules in a tube in three stages:

stage 1: upon reaching 240°C; heating-up period: nine minutes
stage 2: upon reaching 280°C; heating-up period: twenty minutes
stage 3: twenty minutes at 280°C.

The molten rods in each case are spun in a rod spinning apparatus. The samples in stages 2 and 3 show no change with respect to the sample in stage 1.

I claim:
1. A process for the mass coloration or dope dyeing of a polyamide which comprises:
coloring or dyeing chips or granules of the polyamide by dry dusting contact or by absorption from an aqueous liquor with a dye of the formula:

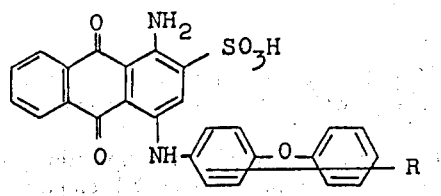

in which R is hydrogen or chloro; and
melting the colored polyamide granules or chips in dry form and processing the melt by extrusion into threads, filaments, wires, sheeting, film or the like.

2. A process as claimed in claim 1 wherein the polyamide granules or chips are dyed from an aqueous liquor at a liquor ratio of from 1:1 to 4:1 at from the boiling temperature to 130°C.

3. A process as claimed in claim 2 wherein the granule or chip dyeing is carried out in a liquor whose pH is from 5 to 6.

4. A process as claimed in claim 2 wherein the dye used for dyeing is one having the formula:

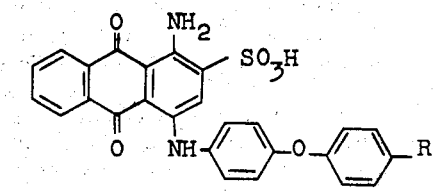

in which R is hydrogen or chloro.

5. A process as claimed in claim 1 wherein the dye used for dyeing has the formula

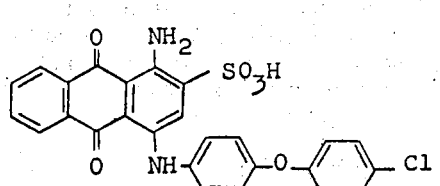

6. A process as claimed in claim 2 wherein the dye used for dyeing has the formula

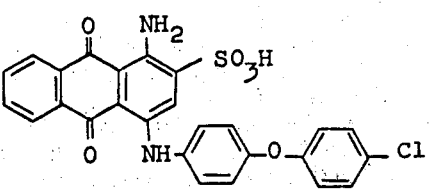

* * * * *